March 19, 1968  C. F. DESMOND ETAL  3,373,633
VISCOUS TORSIONAL VIBRATION DAMPERS
Filed Oct. 23, 1965
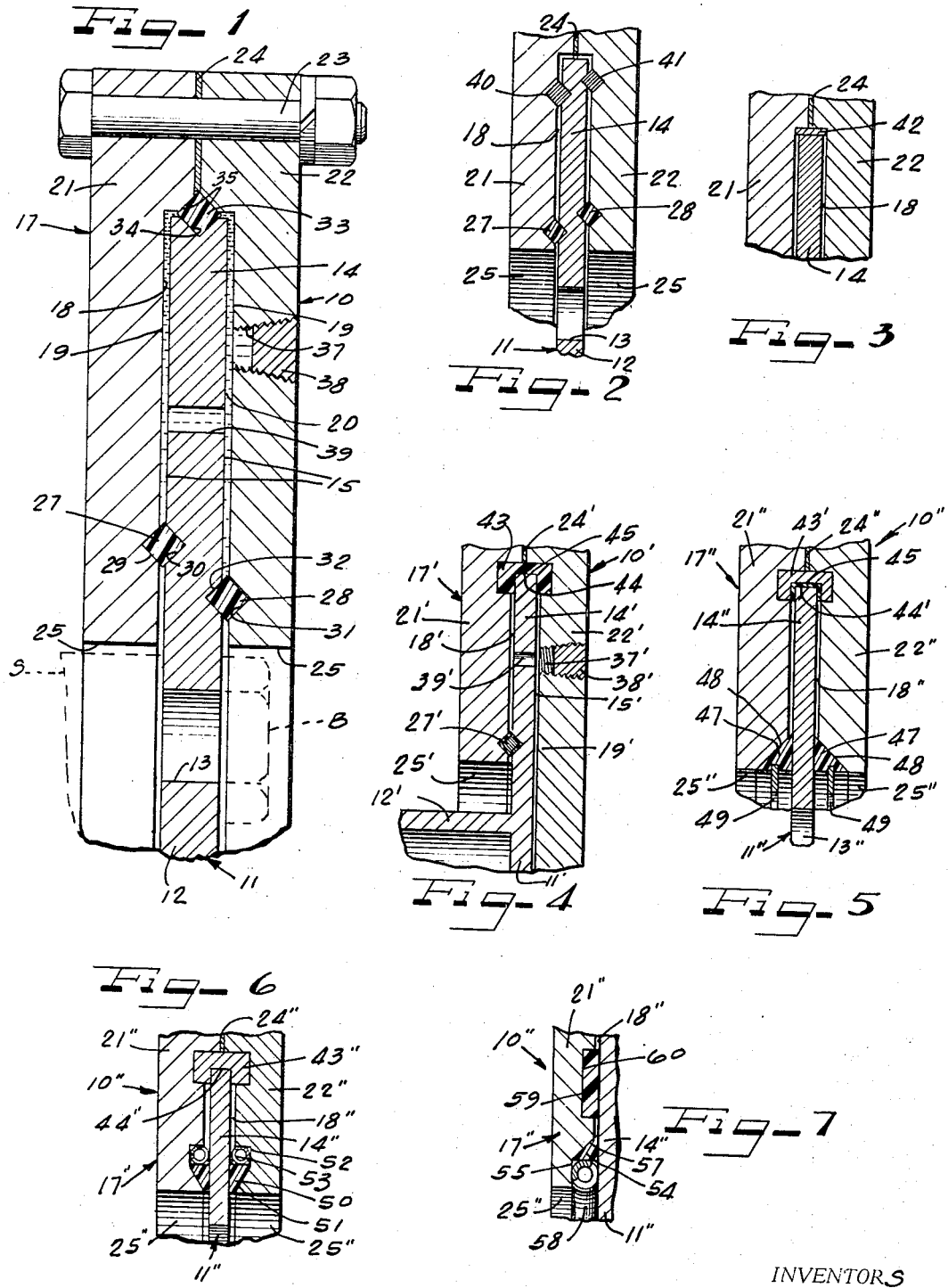
INVENTORS
CHARLES F. DESMOND
ROLLIN DOUGLAS RUMSEY
BY ATTORNEYS United States Patent Office 3,373,633
Patented Mar. 19, 1968

3,373,633
VISCOUS TORSIONAL VIBRATION DAMPERS
Charles F. Desmond, Williamsville, and Rollin Douglas Rumsey, Buffalo, N.Y., assignors to Houdaille Industries, Inc., Buffalo, N.Y., a corporation of Michigan
Filed Oct. 23, 1965, Ser. No. 503,578
15 Claims. (Cl. 74—574)

ABSTRACT OF THE DISCLOSURE

A torsional vibration damper has an attachment hub with a radially extending circular damper disk and mounting flange portion on which is relatively rotatably supported an inertia mass comprising complementary members secured together and defining a working chamber within which viscous damping coupling medium is retained, and a spaced relation between the working faces of the disks and inertia mass is maintained by combination dynamic sealing, bearing and spacing ring means.

The present invention relates to improvements in viscous torsional vibration dampers and is more particularly concerned with reducing the cost of viscous type vibration dampers and increasing the amount of inertia available in the same space as compared with prior viscous torsional vibration dampers.

Numerous advantages have been found to reside in the use of viscous torsional vibration dampers, that is dampers utilizing the phenomenon of resistance to shearing of a thin layer of viscous fluid between relatively moving opposed working surfaces one of which in each instance is attached to the rotary member subject to vibration and the other of which is fixed in relation to an inertia mass. As heretofore generally constructed, such viscous torsional vibration dampers have comprised a housing which is rigidly connected to the rotary mass to be damped and defines a cavity or working chamber within which the inertia mass is relatively rotatably mounted but normally held corotatable by means of a shear film energy absorbing coupling. In such an arrangement the objective has been to make the best use of material by having the inertia mass as heavy as possible with the housing or casing as light as possible.

An important object of the present invention is to provide new and improved embodiments of the novel concept of constructing the inertia mass to provide the working chamber and mounting the same on a supporting and hub disk whereby to minimize costs, increase the amount of inertia available in the same space as compared with prior constructions and attain higher performance.

Another object of the invention is to provide a new and improved viscous torsional damper construction embodying a novel combination bearing, dynamic seal and spacer structure for mounting the fly wheel or inertia mass on the supporting and hub disk.

A further object of the invention is to provide new and improved polymeric means for operatively mounting a fly wheel or inertia member on a relatively thin supporting and mounting flange in a viscous torsional vibration damper.

Still another object of the invention is to provide new and improved bearing and spacer means in viscous torsional vibration dampers.

Other objects, features and advantages of the present invention will be readily apparent from the following detailed description of certain preferred embodiments thereof taken in conjunction with the accompanying drawing, in which:

FIGURE 1 is a fragmentary longitudinal sectional detail view through a viscous torsional vibration damper embodying features of the invention; and FIGURES 2 to 7, inclusive, show various modifications thereof.

A viscous torsional vibration damper 10 (FIG. 1) embodying features of the invention comprises a member 11 in the form of a disk having a flange portion 12 provided with means such as bolt holes 13 receptive of bolts B for mounting of the disk member in concentric corotational relation on a rotary structure, such as a crankshaft S, subject to torsional vibrations in operation. Extending to a substantial radial extent from the hub flange portion 12 is a damper disk portion 14 providing axially opposite working faces 15.

In addition to its function as a damper disk, the portion 14 serves as a mounting flange for an inertia mass 17 defining a working chamber 18 substantially complementary to and having the disk portion 14 therein. Working faces 19 defining the chamber 18 oppose the working faces 15 in parallel predetermined spaced relation and a viscous damping medium 20 in the working chamber couples the opposed working faces 15 and 19. In a desirable arrangement, the spacing between the opposed working faces 15 and 19 is such in respect to the viscous medium 20 as to result in substantially laminar shearing of the viscous material during relative rotary movements of the damping disk portion 14 and the inertia mass 17, whereby energy is dissipated and vibrations are damped. Thus, the inertia mass 17 is freely rotatable with respect to the damper disk portion 14. A viscous damping medium suitable for this purpose may comprise a silicone fluid of preferred viscosity.

In a desirable construction, the inertia mass 17 comprises a pair of complementary, opposed inertia disks or plates 21 and 22, complementally annularly recessed to provide the working chamber 18. Means for securing the inertia plates 21 and 22 operatively together about the circular damping and mounting flange disk portion 14 may comprise any suitable means such as rivets, welding, and the like, bolts 23 being shown as extending through and engaging the outer margins of the inertia mass. A predetermined spacing between the working faces 19 of the inertia plates is adjustably attained by selection in thickness of a sealing gasket 24 between the opposing faces of the inertia plates radially outwardly about the working chamber 18. The bolts 23 enable disassembly of the damper should that ever become desirable, as for readjustments, repairs after long use, or the like.

At least one of the inertia plates 21 and 22 has a central opening 25, and in this instance both of the plates have such an opening adjacent to and for clearance access to the mounting flange portion 12. Means are therefore provided for dynamically sealing the working chamber spaces adjacent to the openings 25. Desirably such sealing means also combine the attributes of bearing and spacer means. To this end respective sealing bearing spacer members 27 and 28 are associated with respectively the inertia plate 21 and the inertia plate 22 which provide the two halves of the inertia mass. In a desirable form, the multi-function sealing member 27 comprises a ring of quadrilateral, and preferably square cross section, with two opposite corners defining the sides of the ring and the remaining two corners defining the inner and outer perimeters of the ring. Mounting of the ring 27 is in a complementary V-shaped seating groove 29 in the working face 19 of the member 21 adjacent to its central clearance opening 25 and into which one side of the ring 27 fits, while the other side of the ring 27 fits in a complementary V-shaped annular groove 30 in the disk portion 14. A similar mounting of the multi-function sealing ring 28 is afforded, though on a differential diameter relative to the ring 27 in order to avoid weakening the relatively thin mounting disk portion 14, a V-shaped annular mounting groove 31 being provided in the working face of the member 22 and a complementary V-shaped opposing groove 32 being provided in the disk portion 14. Through this arrangement, the rings 27 and 28 extend sealingly across the respective working chamber spaces. By having the depths of the respective mounting grooves at the opposite sides of the disk portion 14 as nearly as practicable identical, and the cross sections of the rings 27 and 28 as nearly as practicable identical, substantially accurate equal spacing between the opposed working faces 15 and 19 is maintained by the ring members 27 and 28 serving as bearings between the inertia mass and the flange portion 14.

Although the rings 27 and 28 may be relied upon to maintain radial spacing between the mounting disk and the inertia mass, as well as axial spacing, for relatively heavy duty purposes supplemental bearing and spacer means are provided, desirably comprising a ring member 33 of similar cross section to the ring members 27 and 28, namely quadrilateral and preferably square with opposite corners at opposite sides and at the perimeters of the ring. Seating the ring 33 in the outer perimeter of the disk portion 14 is an outwardly opening V-shaped groove 34. A complementary bearing groove 35 is provided in the inertia plates 21 and 22 opposite the groove 34. Thereby, the ring member 33 cooperates with the rings 27 and 28 in affording bearing and spacer means and relieves the rings 27 and 28 from undue strain.

In order to minimize wear and afford long life for the damping unit 10, the rings 27, 28 and 33 are desirably of a material having a low coefficient of friction, at least on the engaging surfaces of the ring members. While any or all of the ring members may be made from suitable metal, desirable polymeric material is utilized, of which polytetrafluorethylene, available under the trade name Teflon, is especially suitable. Such material may be used with or without fillers such as fiberglass to prevent plastic deformation or cold flow, in accordance with practical working requirements. Although the rings 27, 28 and 33 are preferably integrally continuous in circumference, they may if preferred comprise strips having the ends suitably joined. In respect to the rings 27 and 28 which serve as dynamic seals, unbroken perimeter is highly desirable. In respect to the ring 33, where it functions simply as a bearing and axial and radially spacer supplemental to the axial and radial spacing functions of the rings 27 and 28, a split ring structure may be utilized, if preferred or convenient. Any or all of the rings 27, 28 and 33 may be made from different polymers, such, for example, as all plastic, or part plastic of relatively low elasticity and part elastic, as may be best suited for particular requirements.

For filling the working chamber 18 with viscous damping fluid, a filling opening 37 may be provided in one side of the inertia mass 17 and closed after filling by a plug 38. For equalization of the damping fluid 20 on both sides of the damper flange 14, such flange may be provided with one or more passage holes 39 therethrough.

In a slightly modified arrangement as shown in FIGURE 2, instead of a bearing and spacer ring about the perimeter of the circular mounting flange portion 14, the bearing and spacer rings 40 and 41 are employed at the respectively opposite sides of the flange 14 and mounted in opposing complementary grooves in the members 21 and 22 and the flange 14, substantially the same as the combination sealing, bearing and spacer rings 27 and 28. As shown the rings 40 and 41 are, in this instance, of metal, although they may be of a polymeric material similarly as the rings 27 and 28.

As shown in FIGURE 3, a modified form of perimeter bearing may be used comprising a hoop-shaped bearing ring 42 about the perimeter of the flange 14 and between the opposing surfaces of the inertia plate members 21 and 22.

FIGURE 4 depicts a modified viscous torsional vibration damper 10' in which the disk member 11' is continuous and has only one side of its central portion exposed through an opening 25' in the inertia plate 21', with suitable hub means such as a tubular hub portion 12' for engagement with a rotary member such as a crankshaft subject to torsional vibrations to be damped. On the opposite side of the disk flange 11', the inertia plate 22' is continuous inclusive of its center portion so that substantially the entire opposing face 15' of the mounting and damper disk is opposed by the continuous working face 19' throughout substantially the entire diameter of the disk 11'. Therefore, only the combination bearing, spacer and dynamic seal ring 27' closing the inner end of the space between the inertia disk 21' and the flange portion 14' need be used to retain the viscous fluid at that side of the damper which has the access clearance opening 25'. In this instance the ring 27' comprises a metal core with a covering of suitable polymeric material. In addition, the perimeter of the disk portion 14' is engaged by a bearing ring 43 provided with a guide groove 44 in its inner perimeter within which the edge of the flange portion 14' is in bearing relation and the disk held in axially spaced relation relative to the inertia mass 17'. In this instance, the combination bearing and spacer ring member 43 is of a suitable polymeric material.

In FIGURE 5, the modified damper 10'' is structurally and operatively similar to the damper 10, but the perimeter of the mounting disk flange portion 14'' is engaged within a groove 44' of a bearing and spacer ring 43' which is constructed of metal except for a coating of low coefficient of friction polymer within the groove 44'. In addition, modified combination bearing, dynamic seal and spacer means are provided to close the radially inner diameter ends of the spaces of the working chamber 18'' adjacent to the center clearance openings 25'' in the inertia plates 21'' and 22''. Such means comprise generally triangular or wedge-shaped respective sealing rings 47 engaging against tapered cam surfaces 48 on the inside inner edges of the inertia plates 21'' and 22'' and thrust wedgingly in bearing, sealing, centering relation against the respective opposite sides of the disk member 11'' under the expanding biasing pressure of respective split ring springs 49.

In FIGURE 6 the damper 10'' is substantially similar to the other forms of the damper described, and more particularly the damper 10'' of FIGURE 5 in that the perimeter of the mounting damper disk portion 14'' is engaged within a groove 44'' of a spacer ring 43'', but in this instance shown as of metal, mounted on and between the inertia member plates 21'' and 22'' within complementary recesses therein at the outer edge of the working chamber 18''. Generally triangularly shaped, or wedge-shaped cross section combination bearing, spacer and dynamic seal rings 50 are mounted for camming thrust against respective oblique cam surfaces 51 sloping inwardly toward the opposing faces of the mounting flange disk 11'' within respective grooves 52 in the inertia mass plates 21'' and 22'' adjacent to the central clearance apertures 25'' and also housing garter springs 53 which thrust the respective rings 50 radially inwardly so that they cam on the surfaces 50 into bearing, spacing and sealing engagement with the disk.

In FIGURE 7 is shown a similar damper structure 10'' but in which a generally triangularly or wedge-shaped cross section sealing ring 54 is mounted within a groove 55 which opens through the central opening 25'' in the respective inertia mass plate member and has a radially outwardly and axially inwardly sloping cam surface 57 toward which the ring 54 is thrust by an expanding garter spring 58 retained within the groove 55 and causing the ring 54 to cam into bearing, spacing and dynamic sealing engagement with the opposing face of the mounting flange portion 14" of the disk 11". By proper sizing as to cross sectional diameter, the garter spring 58 may supplement the centering function of the combination ring 54.

Supplemental to, or as an alternate for the wedging ring 54, an annular disk-type combination bearing, spacer and dynamic seal ring 59 may be mounted in a complementary groove 60 in the inner face of the inertia plate and projecting to a suitable distance from the groove to make bearing, spacing and dynamic sealing engagement with the damper disk. Although shown as relatively closely adjacent to the ring 54, where it may be used if desired, such ring 59 may be used also, or supplemental to the ring 54, adjacent to the radially outer perimeter of the working chamber 18".

An advantage inherent in the wedging types of bearing, centering and sealing rings 47, 50 and 54 resides in their automatic wear takeup capability since they are constantly cammingly thrust substantially uniformly throughout their perimeter against cam surfaces which bias the rings toward the engaged surface of the damper disk under the continuous loading spring bias. This continuous compression bias on the rings also minimizes any cold flow problems that may be encountered in respect to the polymeric material or combination of materials from which the bearing, sealing and centering rings are made.

In all embodiments, the spacer bearing, ring means between the opposed generally radially facing surfaces of the mounting flange of the damper disk and the inertia mass extends protectively across the joint between the inertia plate members for blocking escape of the damping fluid under centrifugal force which may reach substantial magnitude during high speed operational rotation of the damper on a crankshaft, for example.

It will be understood that modifications and variations may be effected without departing from the scope of the novel concepts of the present invention.

We claim as our invention:

1. A torsional vibration damper comprising:
   a member having an attachment flange portion for corotational mounting thereof in concentric relation on a rotary structure subject to torsional vibrations in operation;
   a radially extending damper disk and mounting flange portion on said member and providing axially opposite working faces;
   an inertia mass freely rotatably mounted on and supported by said disk and defining a working chamber substantially complementary to and having said disk portion therein, with working faces opposing said disk portion faces in predetermined spaced relation, and affording on at least one side of said disk portion a clearance opening adjacent to said mounting flange portion;
   said mounting flange portion having a radially marginal portion in said working chamber;
   combination spacer and supporting anti-friction bearing means between and engaging said marginal portion and said inertia mass within said working chamber and functioning at least in part to maintain both radial and axial spacing of said mounting flange portion and said inertia mass;
   a viscous damping medium in said chamber and coupling the opposed working faces of the inertia mass and the disk portion; and
   one of the working faces adjacent to said opening having a recess therein about said opening and combination sealing and bearing ring means in said recess and engaging said disk portion and said inertia mass and dynamically sealing and maintaining said predetermined spaced relation of said working faces adjacent to said opening.

2. A damper as defined in claim 1, in which said recess is annular and the confronting working face adjacent to said opening has a complementary annular recess therein confronting said recess in said one face and mounting said sealing and spacing ring means to extend across the space between said confronting recessed working faces.

3. A damper as defined in claim 1, in which said recess is in a working face of said inertia mass and includes a cam surface sloping toward said disk portion, said ring means having a complementary cam surface engaging said recess cam surface, and biasing means normally thrusting the ring means toward the recess cam surface to effect camming bias of the ring means toward the engaged relation with said disk portion.

4. A damper as defined in claim 1, in which said sealing and spacing ring means comprise a disk ring and said recess is of complementary shape but shallower depth than the thickness of the ring so that the ring projects therefrom toward and into sealing engagement with the opposing working face.

5. A damper according to claim 1 including, in addition, bearing means engaging with the marginal portion of said disk cooperating with the disk in said chamber and the inertia mass in maintaining said spaced relation.

6. A damper according to claim 5, in which said cooperating bearing and spacer means comprise a ring of polymeric material.

7. A damper according to claim 5, in which said cooperating bearing and spaced means comprise a ring partially of metal and partially of polymeric material.

8. A damper according to claim 5, in which said cooperating bearing and spacer means comprise a metal ring.

9. A torsional vibration damper comprising: a round disk member having a central attachment flange portion for corotational mounting in concentric relation on a rotary structure such as a crankshaft subject to torsional vibrations in operation, and also having a radially outer radially extending mounting flange portion provided with oppositely axially facing working faces; an inertia mass freely rotatably mounted on and carried by said mounting flange portion and comprising a pair of opposed complementary annular plate members having portions thereof extending beyond the outer perimeter of said mounting flange portion, defining therebetween a working chamber recessed therein and complementary to said mounting flange portion with respective axially directed working faces opposing the working faces of said mounting flange portion, and providing inner diameter openings affording clearance access to the opposite sides of said mounting flange portion of the disk; means for securing said inertia mass members fixedly together beyond the outer perimeter of said mounting flange portion and with the working faces of the inertia members in predetermined spaced relation; combination spacer and supporting anti-friction bearing means between and engaging said mounting flange portion and said mass members within said working chamber adjacent a radially innermost portion of said flange portion and functioning at least substantially to maintain radial spacing of the flange portion and the members; a viscous damping medium in said working chamber between the opposed working faces of said mounting flange portion and said inertia members.

10. A damper as defined in claim 9, in which said bearing and spacer means are of differential diameter and said disk has respective grooves into which said means project in part.

11. A torsional vibration damper of the character described comprising:
   a disk including means for mounting it corotationally on a rotary member subject to torsional vibrations requiring damping;
   oppositely axially facing working faces on said disk;
   an inertia mass freely rotatably mounted on said disk defining a working chamber having working faces opposed to said disk faces in shear film spaced relation;
   viscous damping fluid in said working chamber between the opposed working faces; and
   antifriction bearing, spacer and dynamic sealing means mounted on a radially extending portion of said mounting means for maintaining said disk and inertia mass in freely torsionally rotatable relation, sealing said working chamber, and maintaining the shear film spaced relationship between said opposed working faces.

12. A viscous torsional vibration damper of the character described comprising:

a circular mounting and attachment disk having central means for securing it corotationally onto a rotary member subject to torsional vibrations requiring damping;

oppositely axially facing working faces on said disk;

an inertia mass having a complementary working chamber therein and mounted on said disk for free torsional rotation and having opposed axially facing working faces opposing said disk working faces in shear film spaced relationship; viscous damping fluid providing a shear film damping coupling between said working faces; and bearing and spacer and dynamic sealing ring means maintaining said shear film spaced relationship and including a ring-shaped inertia mass-supporting antifriction bearing between said inertia mass and the perimeter of said disk within said chamber.

13. A damper as defined in claim 12, in which said ring-shaped supporting bearing is of generally U-shaped cross section providing a groove in which said disk perimeter is received, and the inertia mass defining a recess seating said bearing.

14. A damper as defined in claim 12, in which said inertia mass comprises a pair of separable inertia plate members having a joint which extends radially beyond said disk perimeter, and said supporting ring-shaped bearing extends protectively across said joint for blocking escape of the damping fluid under centrifugal force.

15. A torsional vibration damper comprising:

a member having an attachment flange portion for corotational mounting thereof in concentric relation on a rotary structure subject to torsional vibrations in operation;

a radially extending damper disk and mounting flange portion on said member and providing axially opposite working faces;

an inertia mass defining a working chamber substantially complementary to and having said disk portion therein, with working faces opposing said disk portion faces in predetermined spaced relation, and affording on at least one side of said disk portion a clearance opening adjacent to said mounting flange portion;

a viscous damping medium in said chamber and coupling the opposed working faces of the inertia mass and the disk portion;

confronting working faces adjacent to said opening having matching annular recesses therein which are of generally complementary V-shaped; and a sealing and spacing ring having a quadrilateral cross section with respectively opposite side corner edges and respective opposite corner edges at its inner and outer perimeter, and said side corner edges being complementary to and seating in said grooves with the ring extending across the space between said confronting working faces.

References Cited

UNITED STATES PATENTS

| | | | |
|---|---|---|---|
| 332,793 | 12/1885 | Dickson | 227—190 X |
| 2,939,338 | 6/1960 | Troyer | 74—574 |
| 3,100,648 | 8/1963 | Lee et al. | 277—59 |
| 3,117,467 | 1/1964 | Paulsen | 74—574 |

MILTON BUCHLER, *Primary Examiner.*

G. E. HALVOSA, *Assistant Examiner.*